(12) United States Patent
Hariharan et al.

(10) Patent No.: US 8,315,882 B2
(45) Date of Patent: Nov. 20, 2012

(54) EFFICIENT, PEER-TO-PEER CAPTCHA-BASED VERIFICATION AND DEMAND MANAGEMENT FOR ONLINE SERVICES

(75) Inventors: Rajaraman Hariharan, TamilNadu (IN); Karthik Subbian, Pondicherry (IN); Laura Wynter, Chappaqua, NY (US); Ramakrishnan Kannan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1244 days.

(21) Appl. No.: 12/102,384

(22) Filed: Apr. 14, 2008

(65) Prior Publication Data
US 2009/0260068 A1 Oct. 15, 2009

(51) Int. Cl.
*G06Q 10/00* (2012.01)

(52) U.S. Cl. ............................................ 705/1.1
(58) Field of Classification Search ........................ None
See application file for complete search history.

(56) References Cited

U.S. PATENT DOCUMENTS

| | | | |
|---|---|---|---|
| 7,945,469 B2 * | 5/2011 | Cohen et al. | 705/7.13 |
| 8,005,697 B1 * | 8/2011 | Cohen et al. | 705/7.11 |
| 2007/0143624 A1 * | 6/2007 | Steeves | 713/182 |
| 2007/0192849 A1 * | 8/2007 | Golle et al. | 726/16 |
| 2007/0250920 A1 * | 10/2007 | Lindsay | 726/7 |
| 2008/0209223 A1 * | 8/2008 | Nandy et al. | 713/185 |

* cited by examiner

*Primary Examiner* — Jonathan Ouellette
(74) *Attorney, Agent, or Firm* — Daniel P. Morris, Esq.; McGinn IP Law Group, PLLC (57) ABSTRACT

A system and method configured that may allow performing a human-computer verification including crediting a verified task from a first user to a second user. In additional embodiments, may allow the user to perform a computer operation that require human-computer verification based upon an amount of credits that the user has been provided.

17 Claims, 5 Drawing Sheets

| | |
|---|---|
| $t \in \{1,...,T\}$ | Index for unit time period |
| $c \in \{1,...,C\}$ | Index for clients connected to server |
| $r \in \{1,...,R_c\}$ | Index for requests per client |
| $f(t)$: | Total bandwidth usage as function of time |
| $\bar{f}(t)$: | Ideal bandwidth usage as function of time |
| $\xi(t)$: | Root Mean Square error of total bandwidth usage |
| $x^{rc}_{d/u}$: | Price in points for uploading or downloading, resp (d or u index) |
| $B^{rc}_{d_t}()$: | Download b/w per time, for r and c, function of demand. |
| $B^{rc}_{u_t}()$: | Upload b/w per time, for r and c, function of demand. |
| $B$: | Total bandwidth available per unit time |
| $x^{rc}_{dt}$: | Number of points required to perform a file download by client c at time t |
| $x^{rc}_{ut}$: | Number of points required to perform a file upload by client c at time t |
| $x$: | Vector of both types of decision variables- downloading and uploading |

The system model is as follows:

$$\min_x \sum_{t=1}^{T} \xi(t)$$

$\xi(t) = (f(t) - \bar{f}(t))^2, \forall t \in T$      Root Mean Square error measure $f(t) = \sum_{c=1}^{C} \sum_{r=1}^{R} \left( B^{rc}_{d_t}(D(x_{d_t}^{rc})) + B^{rc}_{u_t}(D(x_{u_t}^{rc})) \right), \forall t \in T$    Bandwidth usage as function of time

$\bar{f}(t) = \sum_{c=1}^{C} \sum_{r=1}^{R} \left( \overline{B^{rc}_{d_t}} + \overline{B^{rc}_{u_t}} \right), \forall t \in T$      Ideal Bandwidth usage function $g(D(x^{rc})_{d_t}) \leq q_{rc}, \forall r = 1,..,R \forall c = 1,...,C$      Quality of Service (QoS) Constraint

$B^{rc}_{d_t} + B^{rc}_{u_t} \leq B, \forall t = 1,..,T \forall r \forall c$      Capacity constraint $x \geq 0$      Price non-negativity

EFFICIENT, PEER-TO-PEER CAPTCHA-BASED VERIFICATION AND DEMAND MANAGEMENT FOR ONLINE SERVICES

BACKGROUND OF THE INVENTION

1. Field of the Invention

The present invention generally relates to Internet security systems, and more particularly to establishing an Internet security system that allows for accrual of credits for human verification applications.

2. Description of the Related Art

A CAPTCHA system is a means of generating new challenges which current computers are unable to accurately solve but most humans can solve. The term CAPTCHA stands for "Completely Automated Public Turing Test to tell Computers and Humans Apart".

Figure 1:
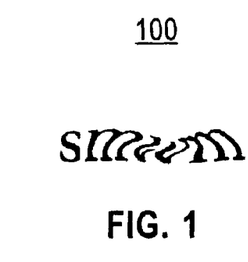
FIG. 1 exemplarily illustrates a CAPTCHA application 100, employing a distortion of text image.
Figure 2:
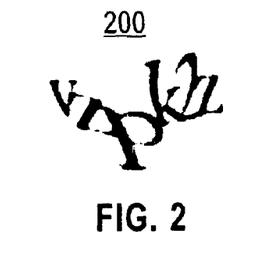
FIG. 2 exemplarily illustrates a CAPTCHA application 200, employing an angled line.
Figure 3:
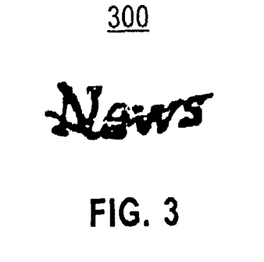
FIG. 3 exemplarily illustrates a CAPTCHA application 300, using a crowded symbol.

FIGS. 1-3 illustrate related CAPTCHA applications. FIG. 1 illustrates CAPTCHA application 100 employing a distortion of text image. FIG. 2 illustrates CAPTCHA application 200 employing an angled line. FIG. 3 illustrates CAPTCHA application 300 using a crowded symbol.

Aside from text CAPTCHAs shown above, even audio and video CAPTCHAs are popular. For example, Google supports audio CAPTCHA in Gmail signup service.

Many internet websites use CAPTCHA to avoid automated use of their internet services. For example, Yahoo.com uses CAPTCHA for creating a new email account and Craigslist uses CAPTCHA when placing advertisements. File sharing sites like RapidShare.com and MegaUpload.com use CAPTCHA to avoid "bots" and/or automated agents from heavily accessing and hence overburdening websites. Thus, CAPTCHA systems are intended to hinder automatic and otherwise computer driven use of websites and other applications, but to allow humans to access the desired content.

The Problem with CAPTCHA technology is that it is too restrictive. Genuine human users are not able to perform efficiently common functions such as queuing downloads or uploads since CAPTCHA requires explicit user intervention exactly at the time that a new download or upload has to begin. Thus, a user has to be present at the start of each download. Or the user possibly has to verify his humanity at various steps across many different applications in one sitting.

Thus, a need exists to improve the ease and efficiency of human users to access multiple CAPTCHA authorizations. In addition, there also exists a need to provide a community of CAPTCHA users to provide a marketplace for CAPTCHA authorization across the community of CAPTCHA users to provide real-time CAPTCHA authorizations.

SUMMARY OF THE INVENTION

In view of these needs, the proposed invention helps to provide for both users and internet service providers by creating a "community of users" helping each other to download/upload multiple files, yet maintaining the integrity and purpose of CAPTCHA for the website.

In an exemplary embodiment of the invention, a method for enabling two or more users to perform a human-computer verification for each other in order to accomplish a computer task requiring human-computer verification is provided, the method including a method to perform a human-computer verification, the method comprising crediting a verified task from a first user to a second user.

In another embodiment of the invention, a human verification system, including a verification management system is provided. The verification management system being configured to perform a human-computer verification, the method comprising crediting a verified task from a first user to a second user.

In another embodiment of the invention, a computer-readable medium tangibly encoded with a program of machine-readable instructions executable by a digital processing apparatus to perform a computerized method for crediting a verified task from a first user to a second user.

BRIEF DESCRIPTION OF THE DRAWINGS

FIG. 7 illustrates algorithm 700 of an exemplary method for computing the number of points needed to perform an exemplary embodiment of the invention;

DETAILED DESCRIPTION OF EXEMPLARY EMBODIMENTS OF THE INVENTION

Referring now to the drawings, and more particularly to FIGS. 1-9, there are shown exemplary embodiments of the method and structures according to the present invention.

The use of word CAPTCHA throughout this application implies all varieties of verification techniques that differentiate humans from computer programs; this may include audio, video and text CAPTCHAs.

This solution also proposes a pricing scheme for the community of users to enable the internet service provider to achieve system goals through the use of this CAPTCHA-based invention. System goals typically include storage and network bandwidth management. The present invention relates to various methods and systems to establishing an Internet security system that allows for ease of use.

The proposed solution allows users to collectively break multiple CAPTCHAs. In so doing, they collect "points" that can be redeemed later, when they wish to upload or download. Since CAPTCHA is only valid at a point in time, a user's CAPTCHA entered in advance would be serving a different user, elsewhere, who wishes to upload/download at that instant. This creates the need for creating the community of users for enabling this solution.

The points earned have value in up/downloading but that value depends on the system goals of the online file sharing service provider. For example, a service provider wishing to shift demand to off-peak times may associate a higher value to each point during the off-peak period, and a low value during peak periods. Another example is that a service provider wishing to favor up/downloads of smaller files may associate a non-linear function to the value of the points in terms of file size.

Figure 4:
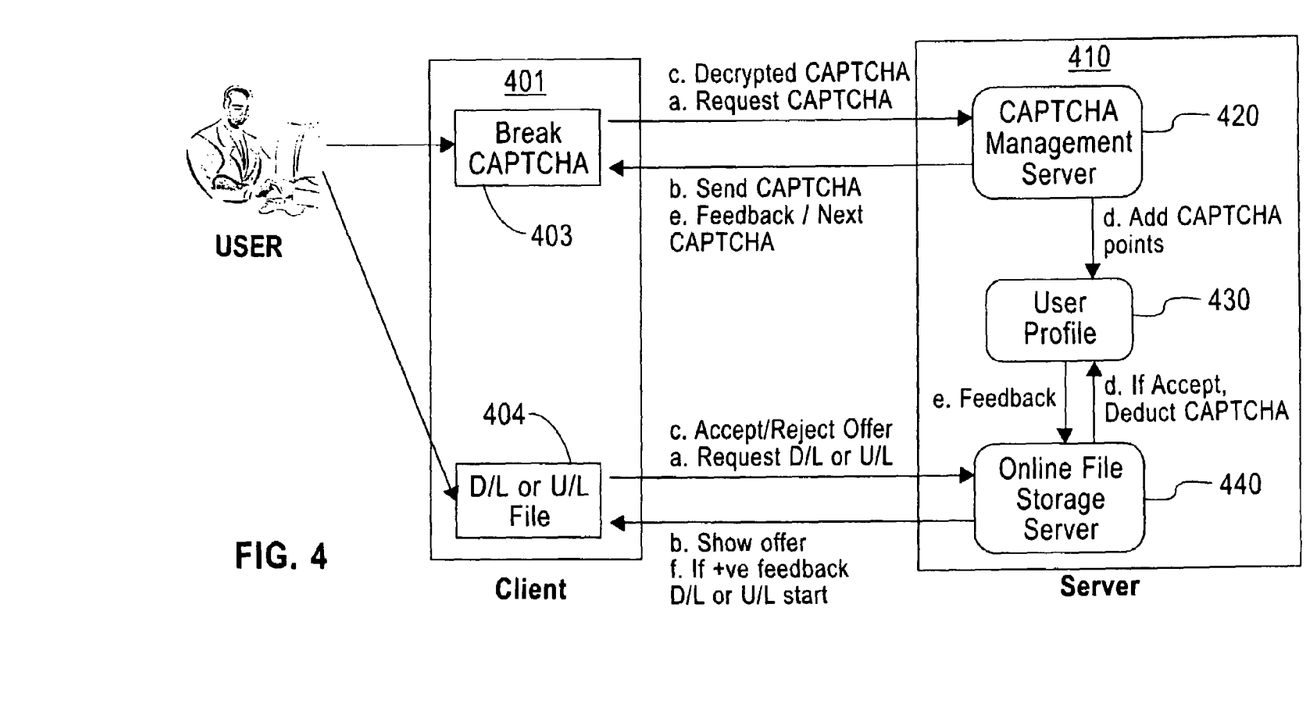
FIG. 4 illustrates a system 400, according to an exemplary embodiment of the present invention.

FIG. 4 illustrates an exemplary embodiment of a system 400 configured to provide a cost based Internet human verification security system according to the present invention. Referring to FIG. 4, a user attempting to access certain information or to perform certain computer activities may access the Internet or other computer system from client 401 to access server 402.

One example of the computer activities a user may perform includes downloading or uploading files 404. In addition, the user may also attempt other computer activities such as joining an email list, signing up for email access, entering a queue to purchase items, accessing information, or posting information.

Some Internet or computer systems may attempt to restrict access to these computer activities by verifying that the user is actually a human and not a program or other automated device attempting to access the computer activities. In an exemplary embodiment, the verification includes a CAPTCHA application and the user must break the CAPTCHA 403 at client 401 to access or activate the desired computer activity.

In an exemplary embodiment, the desired computer activity, such as an upload or download, would be provided at online file storage server 440. Online file storage server 440 and CAPTCHA management server 420 would be provided in server 410. Depending on the embodiments, online file storage server 440 and CAPTCHA management server 420 would be provided together or separately on different servers. In an exemplary embodiment, CAPTCHA management server 420 would also be provided as a verification management system. That is, the verification management system performs a human verification test, including, but not being limited to CAPTCHA applications, to determine if the user is a human.

In an exemplary embodiment, the desired computer activity may be provided by online file storage server 440. That is, online file storage server 440, can provide an uploading and downloading function. In other embodiments, other computer programs and systems can be provided to complete the other desired computer activity.

In addition, in an exemplary embodiment, user profile 430 can be stored on server 410. User profile 430 may include data about the user. As will be described, this data may include information including verification points accrued as the user solves CAPTCHA applications. User profile 430 may also be provided in a user profile storage unit. The user profile storage unit may alternately be a storage location provided at any location in a server or another associated server.

In an exemplary embodiment, the verification system allows users to collectively break multiple CAPTCHAs. In so doing, the users may collect "points" that can be redeemed later, for example, when they wish to upload or download a file. Since CAPTCHA is only valid at a single point in time, a user's CAPTCHA entered in advance would be serving a different user, elsewhere, who wishes to upload/download at that instant. This creates the need for creating the community of users for enabling this embodiment. Therefore, another embodiment includes associating a plurality of users to share points between the users so that a first user's CAPTCHA application verification can be used by another user.

By associating a plurality of users, the embodiment can allow one user's successful verification of a CAPTCHA application to allow access of another user to a requested computer task. In addition, the other user may have to redeem his earlier points to access the first user's completed CAPTCHA admission.

The points earned can have value in up/downloading but that value depends on the system goals of the online file sharing service provider. For example, a service provider wishing to shift demand to off-peak times may associate a higher value to each point during the off-peak period, and a low value during peak periods. Another example is that a service provider wishing to favor up/downloads of smaller files may associate a non-linear function to the value of the points in terms of file size.

Embodiments of the present invention may present a user with types of tasks. First, the user may break or decrypt a CAPTCHA application. On the other hand, the user may choose to perform a computer action, such as downloading or uploading a file.

When the user chooses the option to break a CAPTCHA application, the system initiates a CAPTCHA break method. An embodiment of the CAPTCHA break method may include requesting a CAPTCHA application. For example, in an exemplary embodiment, the client side application requests an initialization of a CAPTCHA application from a CAPTCHA management server.

Next, a CAPTCHA Management server responds with a CAPTCHA application. The client then displays the CAPTCHA application to the user. The user may then decrypt or solve the CAPTCHA application. Upon completing the decryption, the user may submit the CAPTCHA submission. Upon receipt of the submitted CAPTCHA submission, the CAPTCHA management server verifies the response. If the response indicates that the user has correctly decrypted the CAPTCHA application, the method may add points to the user's profile. These added points may be sent back to the user as feedback.

On the other hand, when a user chooses either a download or upload file option, the user sends the download or upload request to the online file storage server. The online file storage server processes the user request through the model and determines the amount of points required to complete the download. The online file storage server then transmits an indication of the amount the points required for download. This indication may be an offer to the user.

If the user rejects the offer, the procedure stops. On the other hand, if the user accepts the offer, detects whether the user's profile has an amount of point that is sufficient to accept the offer. If the user has sufficient points, the user profile system returns a positive feedback. If the user does not have a sufficient amount of points, a negative feedback is returned. Upon positive feedback from the user profile system, the user may begin to download or upload the user's request, and the points are then deducted from the user's profile system.

Figure 5:
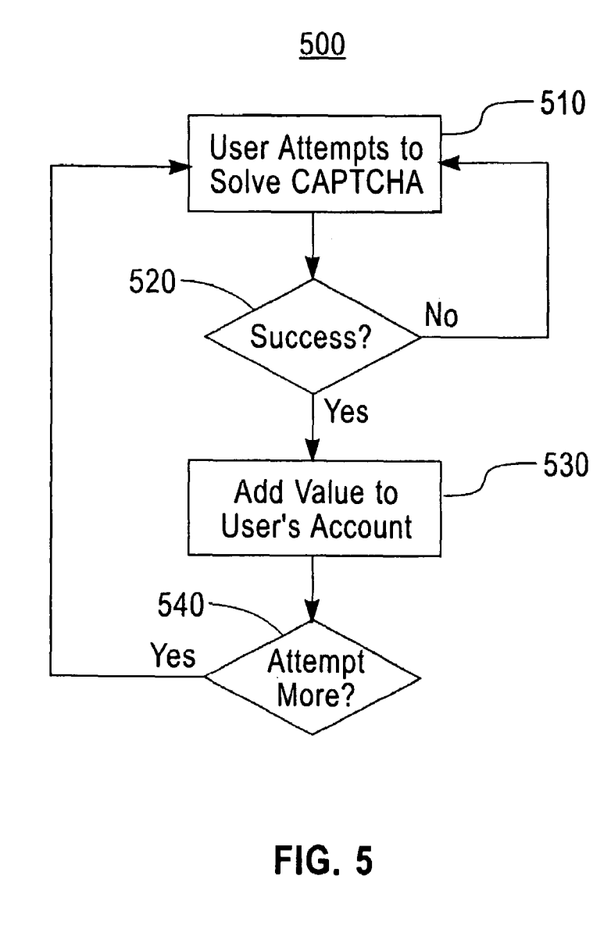
FIG. 5 illustrates in flowchart format a method 500, according to a first exemplary embodiment of the present invention.

FIG. 5 illustrates a method 500 according to a first exemplary embodiment of the present invention. Referring to FIG. 5, the method may start when a user attempts to solve CAPTCHA application verification 510. The CAPTCHA system can then verify that the attempt was successful 520. Upon the successful completion of the human verification, a point or other value may be added to the user's account 530. In an exemplary embodiment, the user may attempt to perform more verification attempts in order to collect more points 540. In addition, in an exemplary embodiment, the user may be required to log-in to an account or to otherwise establish a membership with the point accrual system.

Figure 6:
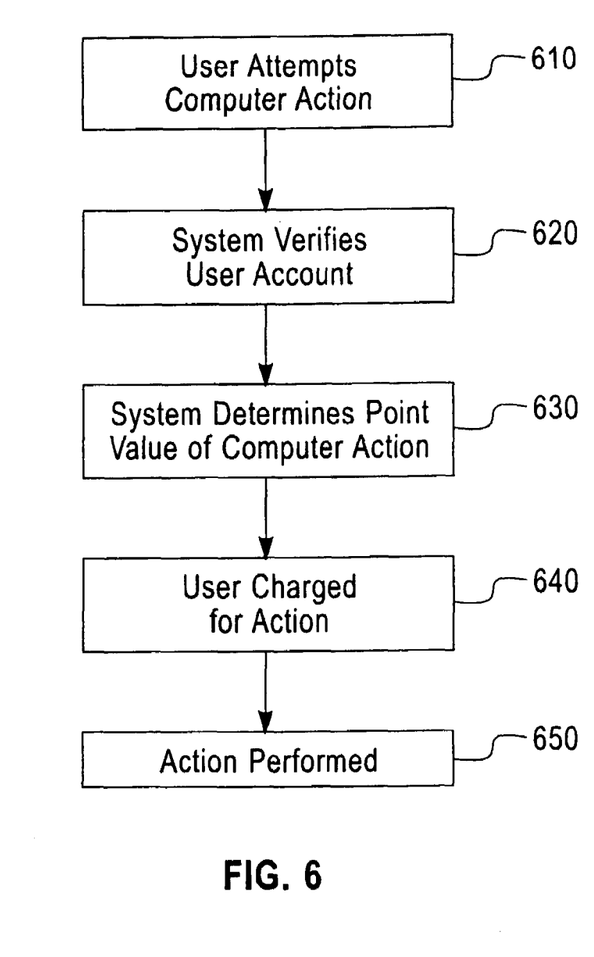
FIG. 6 illustrates in flowchart format a method 600, according to another exemplary embodiment of the present invention.

FIG. 6 illustrates a method according to a second embodiment of the present invention. Referring to FIG. 6, the user attempts to perform a computer activity 610. This computer activity may be protected by a CAPTCHA system. In an exemplary embodiment, the computer activity or action is in someway protected from automated operation or activation.

Once the user attempts to access the computer activity, the system according to an embodiment of the invention verifies that the user has an account 620. That is, in an exemplary embodiment, the user may be logged into an account. In other embodiments, the user may be requested to login. By logging in or registering, the system is able to associate the user to an account containing CAPTCHA credits or points, such as those points or credits accrued in the embodiment illustrated by FIG. 5.

In an exemplary embodiment, the system may determine the amount of points required to perform the requested action 630. For example, some operations may consume more processor time than other actions. Furthermore, some actions may result in a greater intrusion into one's privacy. Accordingly, the value of the computer action is determined.

Upon determining the value of the computer action, the user may be charged for the computer action 640. Within the step of being charged for the computer action 640, the system may determine whether or not the user has accrued enough points or credits to meet the value of the computer action. If the user has enough points, however, these points are deducted from the user's account 650.

In another aspect of an exemplary embodiment of the security systems, is that, in order to accomplish system goals, however, there does not need be a one-to-one correspondence between the computer task and the CAPTCHA entered. In other words, the number of points required to perform a computer task, such as a file download, may depend on several factors: the time of day or day of the week, the file size, etc. Thus, for example, in the determination of the point value of the computer action 630 described above, many different computational formulas may be employed.

Thus in an exemplary embodiment, the association between the number of points needed to perform the computer task and the desired point in time of the task may be determined through the use of an algorithm provided in an exemplary embodiment of the security system. In an exemplary embodiment, the number of points required to perform the computer tasks are determined so as to accomplish the system goals of the internet service provider. That is, the ISP determines how many points should be required to accomplish a certain goal.

In one example, the demand for performing the computer tasks is modeled through a demand function. The demand function depends on price, in particular. When the price is increased, typically, the demand decreases. Such demand functions are common in the literature and in practice and can take on a variety of forms, the precise form of which would be calibrated to the circumstances of the use of the invention.

In an exemplary embodiment, the ISP's goal may be to obtain a more evenly-distributed usage of network bandwidth. Note that alternative resources that may be used as metrics in the algorithm can include performance factors such as computer memory and/or CPU power. Hence, in addition to the demand function, the algorithm makes use of other parameters associated with the system, such as the desired system usage over time. In the case of network bandwidth, used in the example algorithm, a target bandwidth usage is employed. That target usage level may be the mean usage level over the course of a day, but applied consistently over the entire day. Capacity constraints of the system can also be included, if available.

Thus, in an exemplary embodiment, the security system may consider a system goal exclusively in terms of bandwidth. In practice, computer tasks may use vastly different amounts of resources. Then, the model and algorithm would in all likelihood take into account the size of the computer task. In a simple such case, the number of points required by a computer task would be for tasks of unit size. For example, in some embodiment, if a task is a file upload or download, a unit size may be 1 MB. If the internet service provider wishes to favor, for example, tasks of smaller size (so as not to use computer or network resources for large blocks of time) or larger size (to have fewer, larger customers and less initialization time in total), then the algorithm may be adapted so that the total number of points for the computer task is determined, rather than the unit price. In so doing, nonlinear pricing may be applied.

One exemplary example of nonlinear pricing is concave-pricing, in which the per-unit price, or number of points, required decreases with the increasing size of the total task, e.g. a 1-MB task may cost 1 point, a 4-MB task may cost 3 points, and a 10-MB task may cost 5 points. Convex pricing favors smaller-sized tasks; an example is where a 1-MB task costs 1 point, a 4-MB task costs 6 points, and a 10-MB task costs 20 points.

Of course, other goals, including combinations of goals, are possible as well. For example, the system provider may wish to even the usage over time of the network and computer resources as well as favoring the use of smaller-sized tasks. The output of the algorithm is a set of points, which act much like "dynamic prices" for the computer task at hand.

FIG. 7 illustrates one possible algorithm 700 employed by one exemplary embodiment that includes a mechanism for computing the number of points needed to perform the various computer tasks offered by the internet service provider.

Referring to FIG. 7, the algorithm 700 seeks to achieve a bandwidth target over time and a given time horizon, such as a day or a week through associating the computer task with a number of points needed to perform the task. Specifically, the number of points varies over time in such a way so as to accomplish the goal of achieving or coming close to achieving the bandwidth target. In this example the computer tasks are uploading and downloading files of unit size, or similar sizes. Thus, if the tasks are of quite different sizes, then either the points determined by the algorithm may be associated to tasks of unit size, and the total task cost multiplied by the task size. Otherwise, the algorithm could be extended to include the task sizes explicitly and in so doing could incorporate nonlinear pricing techniques.

In the exemplary model referred to in FIG. 7, an ideal system usage level for the online download/upload service provider would be determined. The model determines the set of prices for CAPTCHA points as a function of time. Those computed prices should thus be used so as to best achieve a system goal. All parameters and system variables are indexed by a time index, t. Each of the decisions to be made is made at a point in time, and the model determines the set of prices and hence system behavior over a given time interval, T. For example, the horizon T may represent one day and each t may represent a minute in the day. Then, the model would be rerun each time interval, T, with some overlap so as not to create problems at the boundaries.

The prices for the CAPTCHA points would be referred to as x, again with the indices and superscripts as noted in the text. The means of determining the set of prices that can help best achieve the system goal is by making use of a demand model, referred to as D(.). In this case, the demand, D, is a function of the price, x. This is a standard approach to modeling demand, and numerous well-accepted forms of such demand functions are available: in general, such a demand function decreases with increasing price, x. The bandwidth used, be it for uploading or downloading, is itself a function, in this case of the demand, D. In other words, for some given demand level and some given price, a bandwidth usage level (uploading and downloading) will be induced; this relationship is captured by the functions B(D(x)).

The ideal bandwidth usage level, of both uploading and downloading, needs to be defined by the service provider in order to use this system model.

Those values are given by the B's which have bars above them. It is not difficult for a service provider to identify ideal bandwidth usage levels, based on historical data; it is sufficient to find efficient operating points and identify to which level of bandwidth they corresponds. It need not be a unique best bandwidth level, rather it can be the highest bandwidth level for which the provider believes they can offer good service. Then, the optimization seeks to minimize the deviation of the expected bandwidth usage from these desired values.

The next formula defines a set of quality-of-service constraints, which force the price to be such that the resulting quality-of-service offered is at least as good as a prescribed value, q. The function g(.) translates the demand for bandwidth to a quality-of-service. Indeed, the more bandwidth is used, beyond some limit, the lower the quality-of-service may be, for certain providers. The form of this function must be calibrated, but can be done based on observing usage levels and resulting quality-of-service levels.

The capacity constraints also requires information specific to the service provider. These constraints provide a hard limit on the amount of bandwidth that can be offered at any point in time. It has a similar effect to the quality-of-service constraint described above.

Finally, in order to ensure that prices as computed are not negative, i.e. that no rebates are provided, the model would state that each computed value of x is at least 0.

As an example of the functioning of the system, let us assume that, at an instance in time, user X downloads a file which requires P points. These P points correspond to breaking N CAPTCHA's. Now, there are at the same time as those users who require CAPTCHA's being broken other users willing to break CAPTCHA's. Let us assume there are M such users currently logged on in point accrual mode willing to break CAPTCHA's. These M users or a subset of them will be presented the abovementioned N CAPTCHA's and each user will be credited some share of these P points.

Thus, the points acquired by a user by breaking points may be different depending on when the user breaks the CAPTCHA. For time periods that are of particular need, due for instance to less users being available to break CAPTCHAs, the number of points awarded to a user for breaking a CAPTCHA may be determined in an analogous way by such an algorithm.

Exemplary Software Implementation

Figure 8:
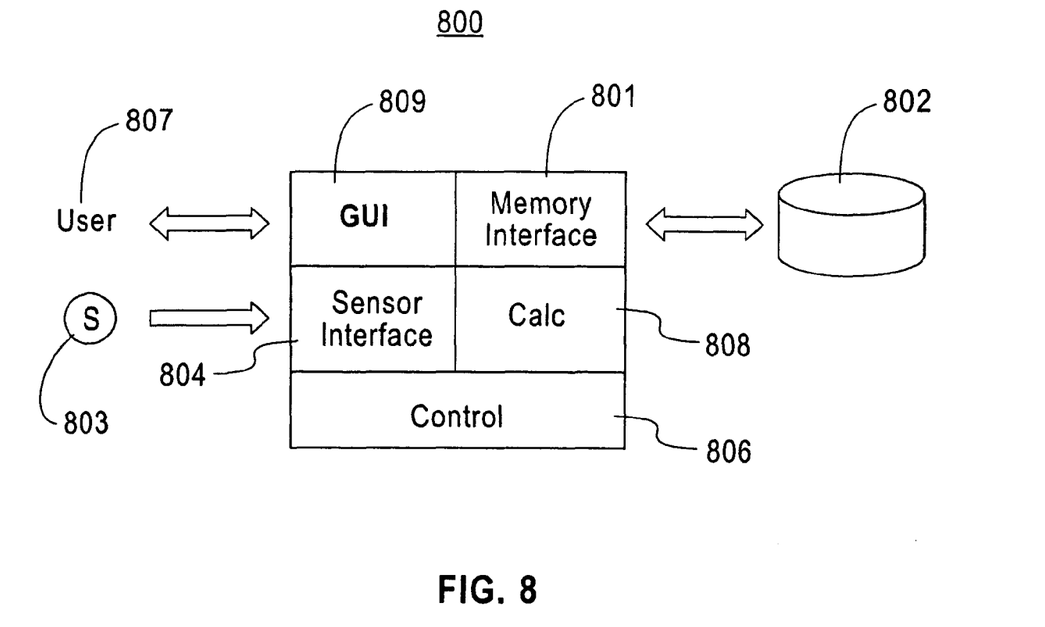
FIG. 8 exemplarily illustrates an exemplary block diagram 800, of an exemplary program according to another embodiment of the invention.

FIG. 8 shows an exemplary block diagram 800 showing a possible application program that could implement the methods of the present invention. The memory interface module 801 interfaces with memory 802 storing information on the network, including historical data. Sensors 803 provide data to the sensor interface module 804, which data could be transferred to memory 802 via memory interface module 801. Calculator module 808 performs the calculations described in the equations above, and control module 806 interconnects the software modules, possibly as a main program. Graphical user interface 809 permits user inputs to control the application as well as the mechanism to display results.

Exemplary Hardware Implementation

Figures 9, 10:
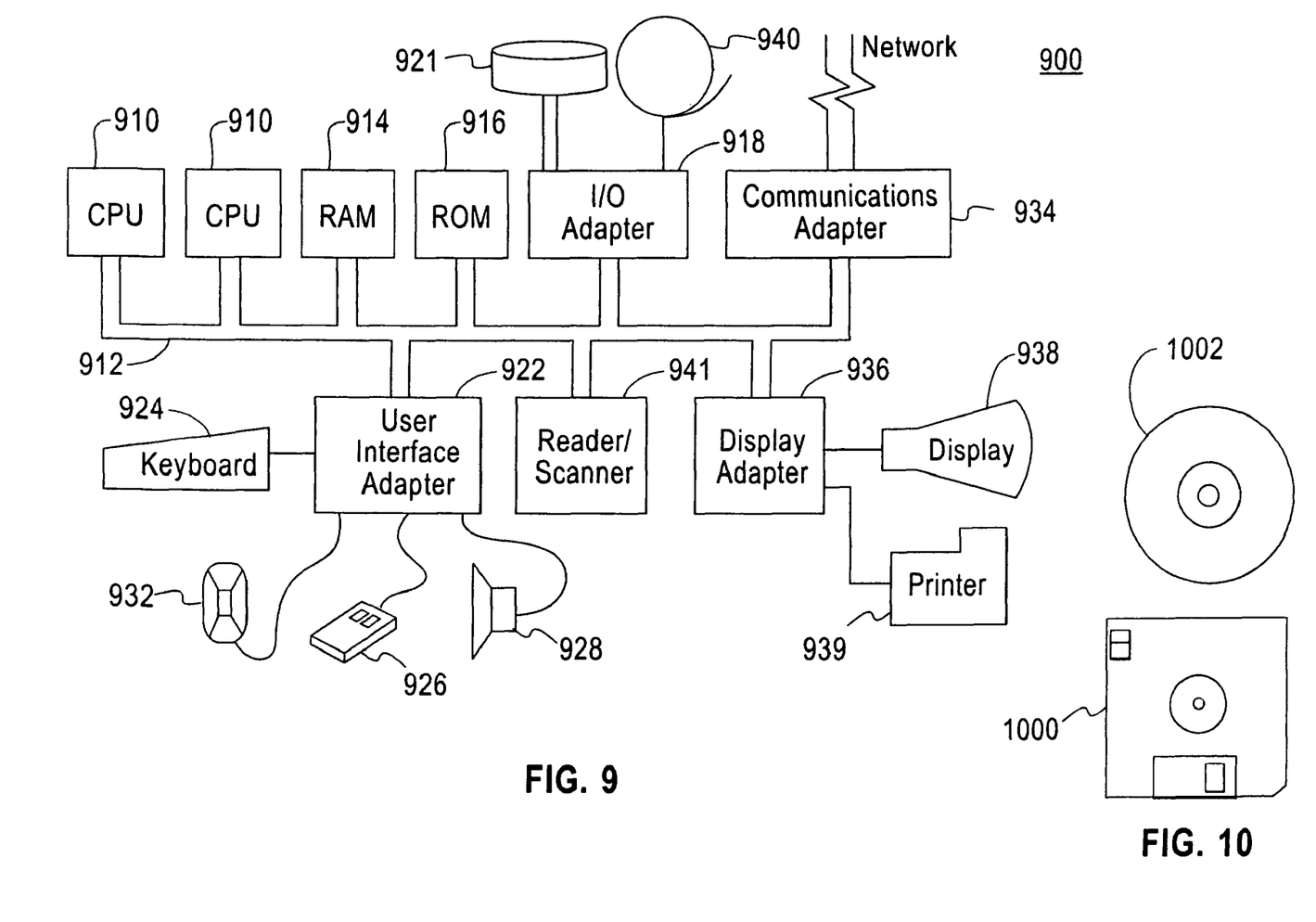
FIG. 9 exemplarily illustrates a typical hardware configuration 900, of an information handling/computer system that could be used to implement the invention.
FIG. 10 exemplarily illustrates disk storage devices 1000 and 1012, configured to store instructions to execute a method of the invention.

FIG. 9 illustrates a typical hardware configuration of an information handling/computer system in accordance with the invention and which exemplarily has at least one processor or central processing unit (CPU) 911.

The CPUs 911 are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 929, speaker 928, microphone 932, and/or other user interface device to the bus 912), a communication adapter 934 for connecting an information handling system to a data processing network, the Internet, an Intranet, a personal area network (PAN), etc., and a display adapter 936 for connecting the bus 912 to a display device 938 and/or printer 939 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 911 and hardware above, to perform the method of the invention.

This signal-bearing media may include, for example, a RAM contained within the CPU 911, as represented by the fast-access storage for example. Alternatively, the instructions may be contained in another signal-bearing media, such as a magnetic data storage diskette 1000 (FIG. 10), directly or indirectly accessible by the CPU 911.

Whether contained in the diskette 1000, the computer/CPU 911, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), optical storage device (e.g. CD-ROM, WORM, DVD, digital optical tape, etc.) 1002, paper "punch" cards, or other suitable signal-bearing media including transmission media such as digital and analog and communication links and wireless. In an illustrative embodiment of the invention, the machine-readable instructions may comprise software object code.

While this invention has been described in connection with certain exemplary embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

Further, it is the inventor's intent to retain all equivalents of the claimed invention even if the claims are amended during prosecution.

What is claimed is:

1. A method to perform a human-computer verification as performed by a processor on a computer, the method comprising:
    crediting, performed by the processor, a verified task from a first user to a second user; and
    awarding points to either one of the first user or the second user,
    wherein the points comprise points that are redeemable for future computer operations.

2. The method of claim 1, further comprising providing points to either one of the first user or the second user upon an accomplishment of the verified task.

3. The method of claim 1, further comprising allowing either one of the first user or the second user to perform a computer operation that requires human-computer verification based upon an amount of points that the one of the first user or the second user has been provided.

4. The method of claim 3, wherein the allowing the one of the first user or the second user to perform the computer operation comprises calculating a value of the computer operation.

5. The method of claim 4, wherein the calculating of the value comprises determining a system goal for a computer system to perform the computer operation.

6. The method of claim 3, wherein the computer operation comprises one of uploading or downloading one or more files.

7. The method of claim 1, wherein the verified task comprises a computer authentification.

8. The method of claim 1, wherein the verified task comprises presenting a video CAPTCHA to the user to determine if the user is human.

9. The method of claim 1, wherein the verified task comprises presenting an audio CAPTCHA to the user to determine if either one of the first user or the second user is human.

10. The method of claim 1, wherein the verified task comprises presenting an image CAPTCHA to the user to determine if either one of the first user or the second user is human.

11. The method of claim 1, further comprising recording the accomplishing of the task by either one of the first user or the second user.

12. The method of claim 1, further comprising offering either one of the first user or the second user a cost in points from a user's account to perform a requested computer operation.

13. A human verification system, comprising:
    a verification management system configured to credit a verified task from a first user to a second user; and
    a server associated with a plurality of users,
    wherein the verification management system is configured to share the human verification test results among the plurality of users to redeem a first user's verification score with a second user's current completion of the human verification test to allow the first user to access the requested computer activity.

14. The human verification system of claim 13, further comprising:
    a user profile storage unit provided to store user data and a user verification score; and
    a computer activity unit configured to perform the computer task requested by either one of the first user or the second user.

15. The human verification system of claim 13, further comprising:
    a server configured to store the verification management system; and
    a client unit associated with the server and being configured to provide access to the verification management system to the user.

16. The human verification system of claim 13, wherein the verification management system is configured to compute a computer activity value associated with the requested computer activity and to deduct that value from the user verification score.

17. A computer-readable storage medium tangibly encoded with a program of machine-readable instructions executable by a digital processing apparatus to perform a computerized method, said method comprising:
    crediting a verified task from a first user to a second user;
    adding a credit to a user verification score for either one of the first user or the second user when the one of the first user or the second user successfully completes the verified task; and
    deducting the credit from the user verification score when the one of the first user or the second user requests a computer operation to be performed and the computer operation is performed.

* * * * *